United States Patent
Trotter et al.

(10) Patent No.: US 7,722,001 B2
(45) Date of Patent: May 25, 2010

(54) BAR CLAMP ASSEMBLY (75) Inventors: Jason K. Trotter, Des Plaines, IL (US);
Robert K. Dutzi, Palatine, IL (US);
Dennis M. Mark, Palatine, IL (US);
Jeremy M. Beck, Hartford, CT (US)

(73) Assignee: Illinois Tool Works Inc., Glenview, IL (US)

( * ) Notice: Subject to any disclaimer, the term of this patent is extended or adjusted under 35 U.S.C. 154(b) by 472 days.

(21) Appl. No.: 11/717,844

(22) Filed: Mar. 14, 2007

(65) Prior Publication Data
US 2007/0158506 A1 Jul. 12, 2007

Related U.S. Application Data

(63) Continuation-in-part of application No. 11/497,619, filed on Aug. 2, 2006, now abandoned.

(60) Provisional application No. 60/740,465, filed on Nov. 29, 2005.

(51) Int. Cl.
*F16L 3/08* (2006.01)
(52) U.S. Cl. ...................................... 248/65
(58) Field of Classification Search ............... 248/72, 248/74.1, 230.1, 230.5, 231.61, 505
See application file for complete search history.

(56) References Cited

U.S. PATENT DOCUMENTS

| | | | | | |
|---|---|---|---|---|---|
| 2,883,136 | A | * | 4/1959 | Smalley | 248/230.5 |
| 3,061,253 | A | * | 10/1962 | Keaton | 248/74.1 |
| 3,243,151 | A | * | 3/1966 | Varney et al. | 248/74.1 |
| 3,347,572 | A | * | 10/1967 | Pfaff, Jr. et al. | 403/27 |
| 3,547,386 | A | * | 12/1970 | Clarke et al. | 248/63 |
| 4,595,164 | A | * | 6/1986 | Froutzis et al. | 248/429 |
| 4,595,165 | A | * | 6/1986 | Klingensmith et al. | 248/539 |
| 5,016,843 | A | * | 5/1991 | Ward | 248/68.1 |
| 5,215,281 | A | * | 6/1993 | Sherman | 248/74.1 |
| 6,234,541 | B1 | * | 5/2001 | Wagner et al. | 285/197 |
| 6,431,502 | B1 | * | 8/2002 | Goodman | 248/74.1 |
| 7,341,245 | B2 | * | 3/2008 | Joseph | 267/141 |
| 7,377,472 | B2 | * | 5/2008 | Brown et al. | 248/74.1 |

\* cited by examiner

*Primary Examiner*—J. Allen Shriver, II
*Assistant Examiner*—Erin Smith
(74) *Attorney, Agent, or Firm*—Mark W. Croll; Paul F. Donovan (57) ABSTRACT

A bar clamp assembly configured to be secured to a structure through a fastener includes a bar clamp, a securing base, and a fastener retention member. The securing base may be integrally formed with the bar clamp, and is configured to receive and retain the fastener. The fastener retention member is within or on the securing base, and is configured to secure the fastener in the securing base. The bar clamp assembly may also include a plurality of braces, clips and other support structures between the bar clamp and the securing base in order to provide a more robust assembly.

4 Claims, 13 Drawing Sheets

BAR CLAMP ASSEMBLY

RELATED APPLICATIONS

This application is a continuation-in-part of U.S. patent application Ser. No. 11/497,619 entitled Bar Clamp Assembly," filed Aug. 2, 2006, now abandoned which relates to and claims priority benefits from U.S. Provisional Patent Application 60/740,465 entitled "Bar Clamp With Captured Fasteners," filed Nov. 29, 2005. Both of these applications are hereby incorporated by reference in their entireties.

FIELD OF THE INVENTION

Embodiments of the present invention generally relate to clamps, and more particularly to improved bar clamps that may be used in automobile applications to secure a stabilizer bar to a frame.

BACKGROUND OF THE INVENTION

Bar clamps are used to secure bars, rods, or the like to another structure. For example, bar clamps may be used to secure a stabilizer bar within an automobile to an internal frame.

Figure 1:
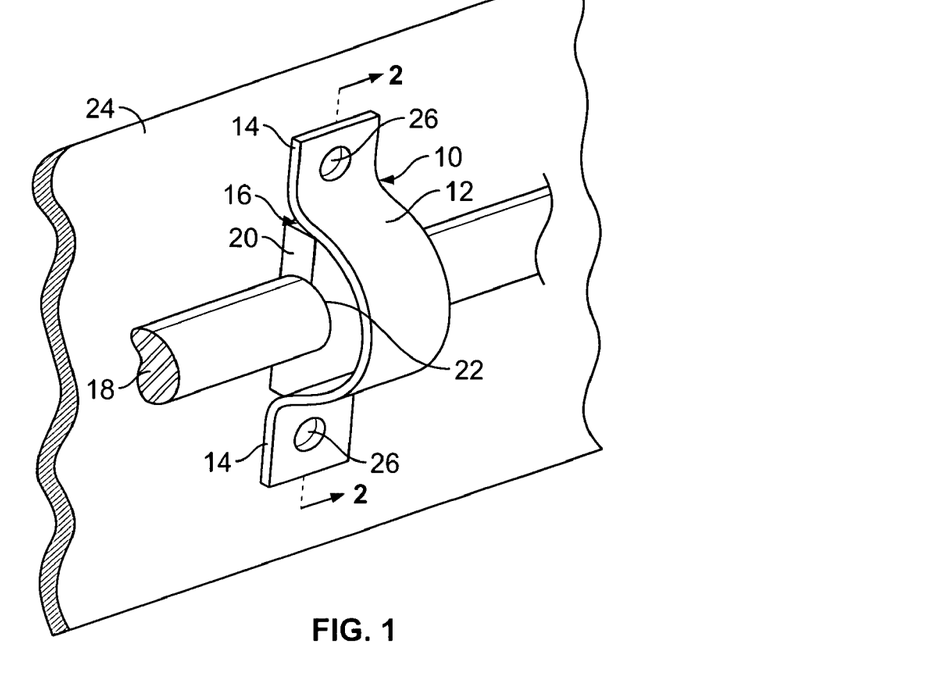
FIG. 1 illustrates an isometric view of a first conventional bar clamp assembly.

FIG. 1 illustrates an isometric view of a first conventional bar clamp assembly 10. The bar clamp assembly 10 includes a standard curved bar clamp 12 integrally formed with fastening straps or areas 14. The bar clamp 12 is curved in a C-or U-shape, thereby defining a bar retention area 16 between the curved bar clamp 12 and the fastening straps 14.

In order to secure a bar 18 to a structure, a bar bushing 20 is positioned within the bar retention area 16. The bar bushing 20 comprises a bar retention channel 22, into which the bar 18 is positioned. The bar clamp assembly 10 and the bar bushing 20 are positioned on a structure 24.

In order to secure the bar clamp assembly 10, and the bar 18, to the structure, fasteners (not shown in FIG. 1) are positioned through holes 26 within the fastening straps 14. The holes 26 are typically circular, and have no features that securely dig into, or otherwise ensure that the fasteners are retained therein. Instead, the fasteners are merely positioned into the fastener straps 14, thereby acting to compressively sandwich the fastener straps 14 between the structure 24, and flanges of the fasteners.

Because the holes 26 are circular, with no retaining structures therein, the fasteners may slide or otherwise move through the holes 26 (or the holes 26 may move over the fasteners), even after the bar clamp assembly 10 has been secured to the structure 24. If, for example, the structure vibrates or resonates, the force produced by the vibration or resonation may cause the bar clamp 12 to dislodge from the structure 24. As such, the fasteners within the holes 26 may be inadvertently loosened within the holes, thereby causing further insecure clamping.

Figure 2:
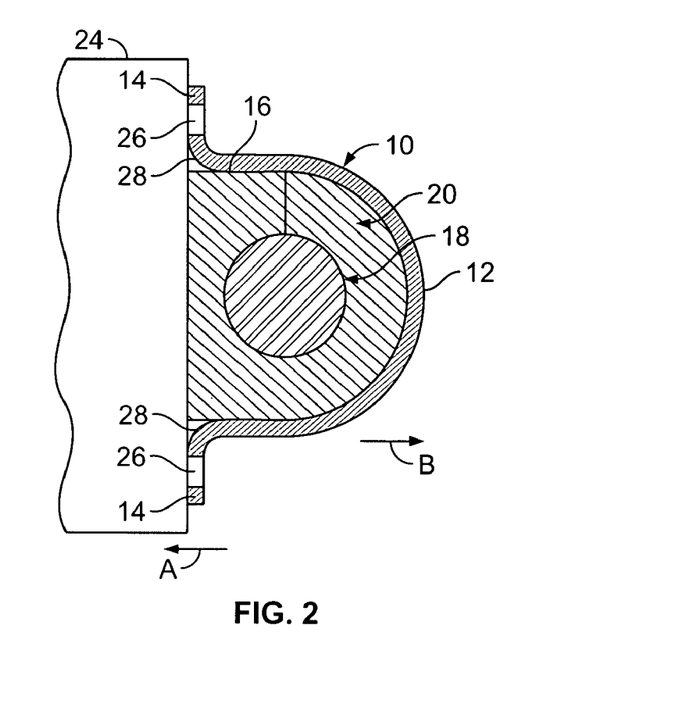
FIG. 2 illustrates a cross-sectional view of a first conventional bar clamp assembly through line 2-2 of FIG. 1.

FIG. 2 illustrates a cross-sectional view of the first conventional bar clamp assembly 10 through line 2-2 of FIG. 1. As shown in FIG. 2, the bar clamp 12 integrally connects to the fastener straps 14 through curved riser areas 28. When the bar clamp assembly 10 is securely mounted to the structure 24, the curved riser areas 28 experience stress fatigue due to the inwardly directed fastening force A, and the equal but opposite resistive force B. As such, the curved riser areas 28 become stress riser fatigue zones, thereby weakening the bar clamp 12 at these curved riser areas 28. If enough stress fatigue is exerted at the curved riser areas 28, the bar clamp 12 may warp or contort at these areas, or even snap or break.

Figure 3:
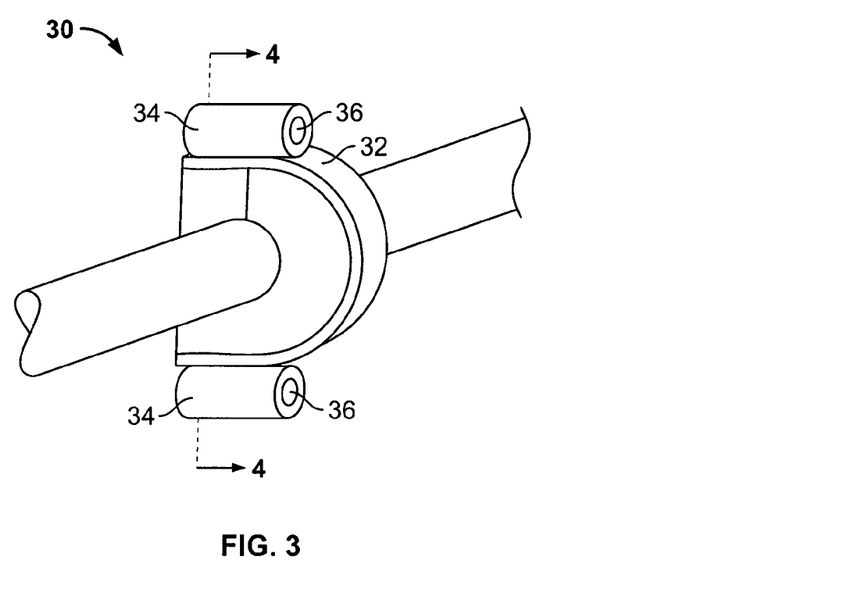
FIG. 3 illustrates an isometric view of a second conventional bar clamp assembly.

FIG. 3 illustrates an isometric view of a second conventional bar clamp assembly 30. The bar clamp assembly 30 comprises a bar clamp 32 and separate fastener compression tubes 34 on either side of the bar clamp 32. The fastener compression tubes 34 may be bonded to the bar clamp 32, and provide support to the bar clamp 32. Similar to the holes 26 of the bar clamp assembly 10, the fastener compression tubes 34 have smooth, tubular channels 36 with no features that are configured to retain fasteners (not shown) therein.

Figure 4:
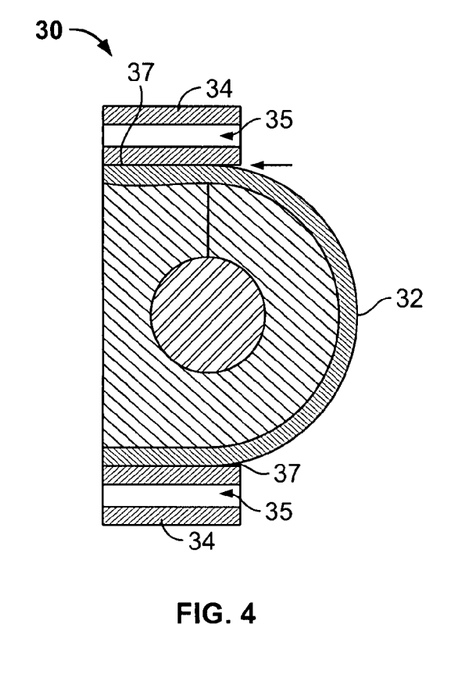
FIG. 4 illustrates a cross-sectional view of a second bar clamp assembly through line 4-4 of FIG. 3.

FIG. 4 illustrates a cross-sectional view of the second bar clamp assembly 30 through line 4-4 of FIG. 3. Typically, the fastener compression tubes 34 are separate pieces that are seam-welded to the sides of the bar clamp 32. Because the fastener compression tubes 34 are seam-welded to the clamp 32, the seams 38 may be weakened areas on the bar clamp assembly 30. In fact, the seams 38 are typically fatigue zones that are susceptible to weakening when subjected to increased temperatures and pressures.

Thus, a need exists for a robust and sturdy bar clamp assembly that does not include weakened areas, such as welded areas, which are susceptible to warping, bending, or breaking due to heat and/or pressure.

SUMMARY OF THE INVENTION

Certain embodiments of the present invention provide a bar clamp assembly configured to be secured to a structure through a fastener. The bar clamp assembly may include a bar clamp, a securing base, and a fastener retention member.

The securing base may be integrally formed with the bar clamp, and configured to receive and retain the fastener. The fastener retention member may be on and/or within the securing base, and is configured to secure the fastener in the securing base.

The securing base may include a fastener tube extending therefrom. The fastener tube defines a fastener through-channel. The fastener retention member extends into the fastener through-channel, and the fastener is securely retained within the fastener through channel by the fastener retention member exerting a gripping force into the fastener.

The bar clamp and the fastener tube may be extruded from a single piece of material, wherein a portion of the single piece of material is rolled to form the fastener tube. Optionally, the fastener tube may be woven together through interlocking members, such as interlocking or intermeshing half-tubes. Additionally, the fastener tube includes a tube shaft that may be tapered and/or crimped in order to engage a surface of a fastener shaft.

Alternatively, the securing base may include a flat fastener strap integrally formed with the bar clamp. The flat fastener strap defines a fastener through-hole, and the fastener retention member extends into the fastener through-hole.

The fastener retention member may include an inwardly-directed protrusion(s), lobe(s), oval passage(s), and/or a canted member(s), such as a tab, barb, clasp, or other such protrusion.

Certain embodiments of the present invention provide a bar clamp assembly that includes at least one support member positioned between the securing base and the bar clamp. The support member is configured to prevent stress fatigue between the bar clamp and the securing base.

The support member may be an angled brace integrally formed between the bar clamp and the securing base. The support member may include a support washer mounted over the securing base and abutting the bar clamp.

Embodiments of the present invention may also include compression tube(s) configured to securely retain the fastener (s). The compression tube(s) may include at least one internal thread configured to engage the fastener(s). Additionally, embodiments of the present invention may include compression tube guide(s) that securely locate the compression tube(s) with respect to the bar clamp. The compression tube guide(s) may include at least one protuberance that prevents the compression tube(s) from dislodging from the bar clamp.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 5:
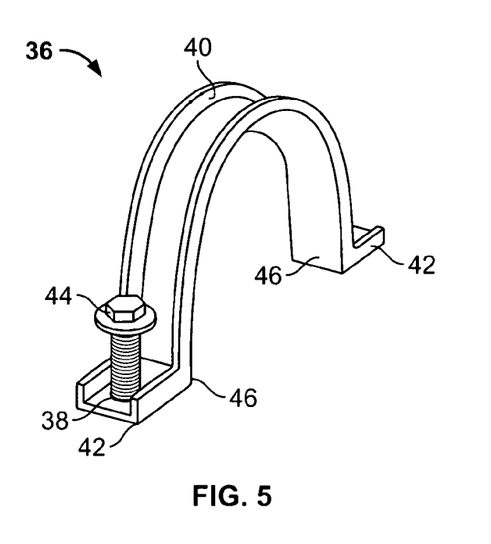
FIG. 5 illustrates a top isometric view of a bar clamp assembly having fastener retention members according to an embodiment of the present invention.

FIG. 5 illustrates a top isometric view of a bar clamp assembly 36 having fastener retention members 38 according to an embodiment of the present invention. The bar clamp assembly 36 includes a bar clamp 40 integrally formed with fastener straps 42. The fastener retention members 38 are formed through the fastener straps 42, and include features that retain a fastener 44, such as a screw, within the fastener members 38.

The bar clamp 40 is a C- or U-shaped bar clamp that may integrally join to the fastener straps 42 at straight edges 46. The straight-edges 46 may be right angles. The straight edges 46 provide a rigid joint between the bar strap 40 and the fastener straps 42 and are less susceptible to bending than smooth, curved joints. Alternatively, the bar clamp 40 may join to the fastener straps 42 through curved or smooth joints.

Figure 6:
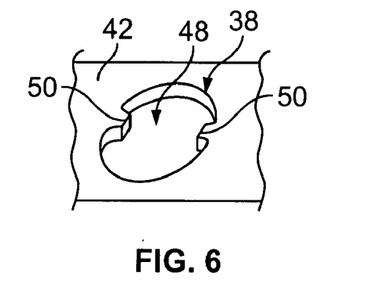
FIG. 6 illustrates an isometric view of a fastener retention member according to an embodiment of the present invention.
Figure 7:
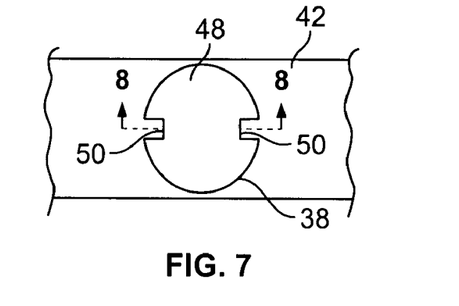
FIG. 7 illustrates a top plan view of a fastener retention member according to an embodiment of the present invention.
Figure 8:
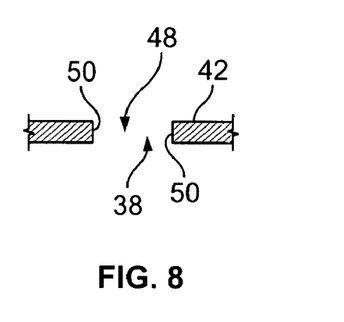
FIG. 8 illustrates a cross-sectional view of a fastener retention member through line 8-8 of FIG. 7.

FIG. 6 illustrates an isometric view of a fastener retention member 38 according to an embodiment of the present invention. FIG. 7 illustrates a top plan view of the fastener retention member 38 according to an embodiment of the present invention. FIG. 8 illustrates a cross-sectional view of the fastener retention member 38 through line 8-8 of FIG. 7 according to an embodiment of the present invention.

Referring to FIGS. 6-8, the fastener retention member 38 includes a fastener through-hole 48 formed through the fastener strap 42. The fastener retention member 38 includes inwardly-directed barbs, clasps, or other such protrusions 50. The inwardly-directed protrusions 50 provide a narrower opening for the fastener to pass. As such, the protrusions 50 grip and/or drag the fastener, and may even be configured to dig into the shaft of the fastener. The gripping, dragging and/or digging force exerted by the protrusions 50 into the fastener shaft acts to assist in retaining the fastener within the fastener retention member 38. Thus, the fastener retention member 38 prevents the fastener from inadvertently moving out of, or otherwise dislodging, from the fastener retention members 38.

Figure 9:
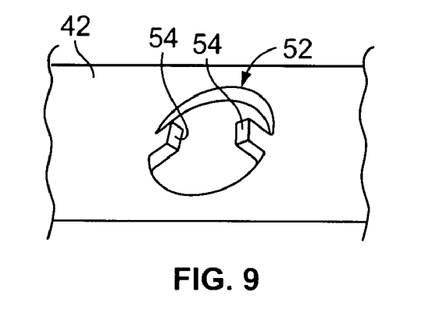
FIG. 9 illustrates an isometric view of a fastener retention member according to an embodiment of the present invention.
Figure 10:
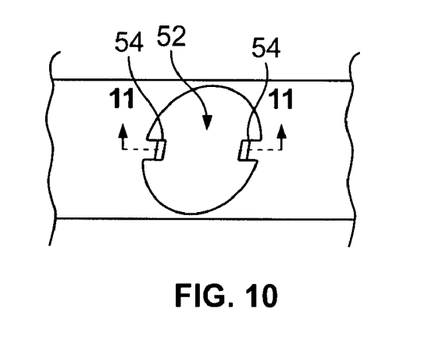
FIG. 10 illustrates a top plan view of a fastener retention member according to an embodiment of the present invention.
Figure 11:
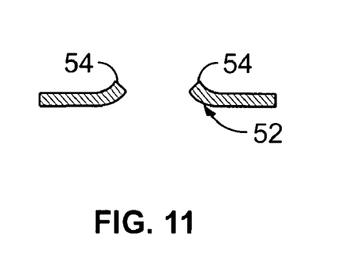
FIG. 11 illustrates a cross-sectional view of a fastener retention member through line 11-11 of FIG. 10.

FIG. 9 illustrates an isometric view of a fastener retention member 52 according to an embodiment of the present invention. FIG. 10 illustrates a top plan view of the fastener retention member 52 according to an embodiment of the present invention. FIG. 11 illustrates a cross-sectional view of the fastener retention member 52 through line 11-11 of FIG. 10.

Referring to FIGS. 9-11, the fastener retention member 52 includes inwardly-directed protrusions 54 configured to securely engage a fastener. The protrusions 54 are similar to the protrusions 50 of FIGS. 6-8, except that the protrusions 54 are not flush with the fastener strap 42. Instead, the protrusions 54 are upwardly canted, as shown, for example, in FIG. 11. When a fastener is engaged within the fastener retention member 52, the protrusions grip and/or drag the fastener, and clamp flat. That is, when the head of the fastener is moved into the protrusions 54, the force exerted into the protrusions 54 flattens them so that they are flush with the fastener strap 42. As the protrusions 54 are flattened, the protrusions are further urged into the shaft of the fastener. The upward cant of the protrusions 54 bracingly grips and/or drags a fastener during assembly, thereby assisting in ensuring that the fastener does not accidentally dislodge from the fastener retention member 52.

Figure 12:
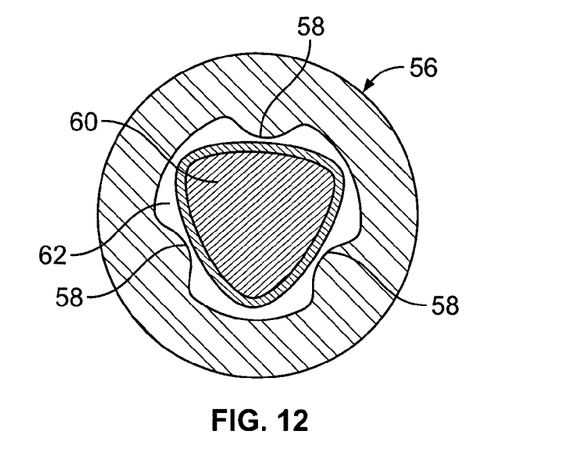
FIG. 12 illustrates a top plan view of a fastener retention member according to an embodiment of the present invention.

FIG. 12 illustrates a top plan view of a fastener retention member 56 according to an embodiment of the present invention. The fastener retention member 56 includes a plurality of inwardly-directed lobes 58 configured to exert a gripping, dragging and/or digging force into a fastener shaft 60. Similar to the protrusions shown and described with respect to FIGS. 6-11, the lobes 58 are directed into the fastener through hole 62, thereby providing a smaller envelope for the fastener 60 to pass. The smaller envelope ensures that the lobes 58 are urged into the fastener 60, thereby gripping, dragging and/or digging into the fastener 60. While three lobes 58 or protrusions are shown, the fastener retention member 56 may have more or less lobes than those shown.

Figure 13:
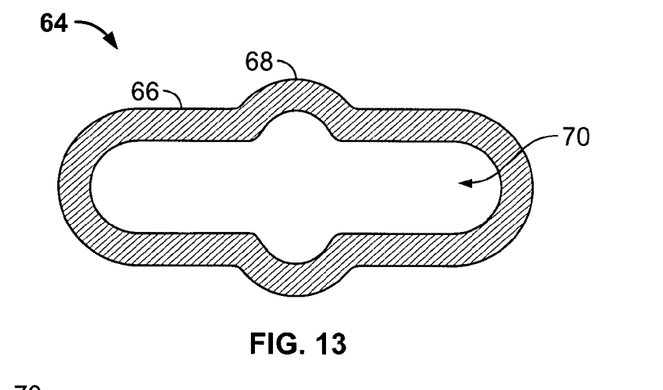
FIG. 13 illustrates a top plan view of a fastener retention member according to an embodiment of the present invention.

FIG. 13 illustrates a top plan view of a fastener retention member 64 according to an embodiment of the present invention. The fastener retention member 64 includes a generally oval shape 66 with an expanded mid-section 68. A fastener through hole 70 is defined through the fastener retention member 64. The expanded mid-section 68 acts as a keying area associated with a proper alignment position.

Figure 14:
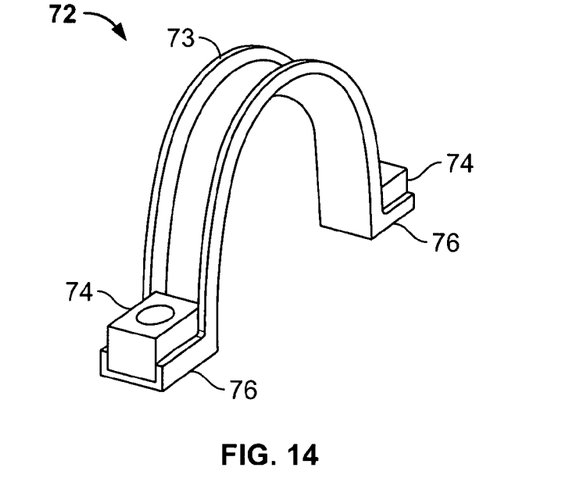
FIG. 14 illustrates a top isometric view of a bar clamp assembly according to an embodiment of the present invention.

FIG. 14 illustrates a top isometric view of a bar clamp assembly 72 according to an embodiment of the present invention. The bar clamp assembly 72 includes a bar clamp 73 and support washers 74 positioned on fastener straps 76.

Figure 15:
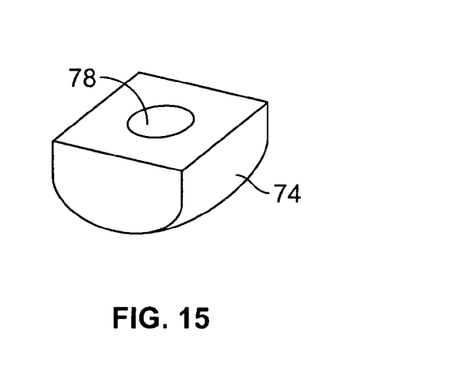
FIG. 15 illustrates an isometric view of a support washer according to an embodiment of the present invention.

FIG. 15 illustrates an isometric view of the support washer 74 according to an embodiment of the present invention. The support washer 74 may be wedge-shaped, or any other shape configured to be securely positioned over the fastener strap 76 (shown in FIG. 14). The support washer 74 includes a fastener through hole 78 that is configured to be aligned with the fastener retention member (not shown in FIG. 15) of the fastener strap 76. The support washer 74 may also include inwardly-directed protrusions.

Referring again to FIG. 14, the support washer 74 is positioned over the fastener strap 764, and abuts the bar clamp 73. Thus, the support washer 74 braces the bar clamp 73 and the fastener strap 76 in order to prevent stress fatigue therebetween. While the support washer 74 is shown as a separate component of the bar clamp assembly 72, the support washer 74 may alternatively be an integrally formed piece of the bar clamp assembly 72.

Figure 16:
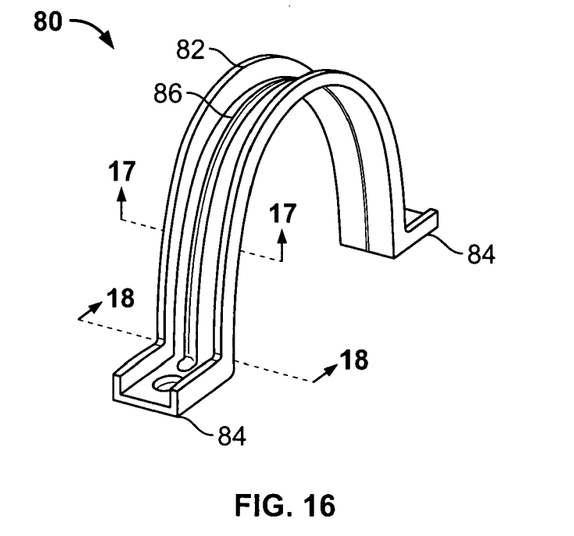
FIG. 16 illustrates a top isometric view of a bar clamp assembly according to an embodiment of the present invention.

FIG. 16 illustrates a top isometric view of a bar clamp assembly 80 according to an embodiment of the present invention. The bar clamp assembly 80 includes a bar clamp 82 integrally formed with fastener straps 84, which may include any of the fastener retention members discussed above. The bar clamp 82 includes a central longitudinal rib 86 that extends over the entire length of the bar clamp 82 and into the union of the bar clamp 82 and the fastener straps 84. The central longitudinal rib 86 may also extend through the fastener straps 84. The longitudinal central rib 86 provides additional strength to the bar clamp 82.

Figure 17:
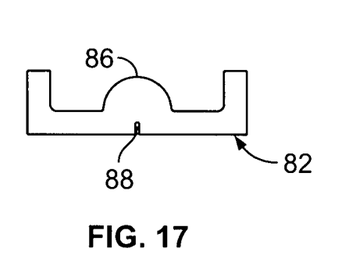
FIG. 17 illustrates a cross-sectional view of a bar clamp through line 17-17 of FIG. 16.

FIG. 17 illustrates a cross-sectional view of the bar clamp 82 through line 17-17 of FIG. 16. The rib 86 strengthens the bar clamp 82, and prevents the bar clamp 82 from warping. The bar clamp 82 may also include a seam 88 underneath the rib 86. The bar clamp 82 is manufactured so that the seam 88 is minimized so that a bar bushing does not become pinched or trapped within the seam 88.

Figure 18:
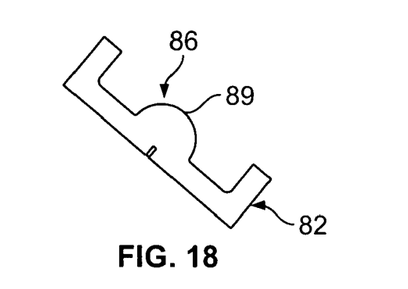
FIG. 18 illustrates a cross-sectional view of a bar clamp through line 18-18 of FIG. 16.

FIG. 18 illustrates a cross-sectional view of the bar clamp 82 through line 18-18 of FIG. 16. Referring to FIGS. 16 and 18, the rib 86 includes an expanded portion 89 proximate the union of the bar clamp 82 and the fastener straps 84 in order to provide increased strength at those positions.

Figure 19:
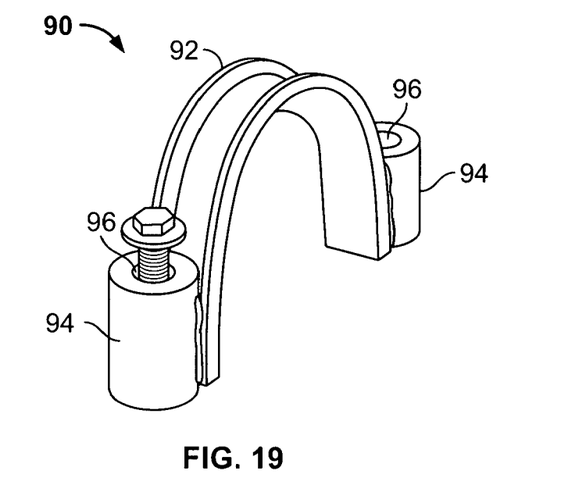
FIG. 19 illustrates a top isometric view of a bar clamp assembly according to an embodiment of the present invention.

FIG. 19 illustrates a top isometric view of a bar clamp assembly 90 according to an embodiment of the present invention. The bar clamp assembly 90 includes a bar clamp 92 joined to fastener tubes or bosses 94. The fastener tubes 94 may be welded to the bar clamp 92, or may be integrally formed with the bar clamp 92.

The fastener tubes 94 include fastener through-channels 96 configured to receive fasteners 98, such as a screw. The fastener tubes 94 may include fastener retention members within the through-channels 96, such as described above, or below.

Figure 20:
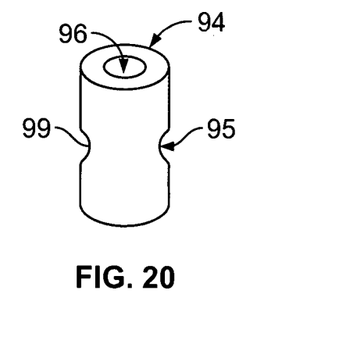
FIG. 20 illustrates an isometric view of a fastener tube according to an embodiment of the present invention.
Figure 21:
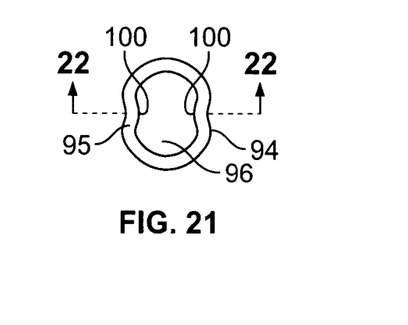
FIG. 21 illustrates a top plan view of a fastener tube according to an embodiment of the present invention.
Figure 22:
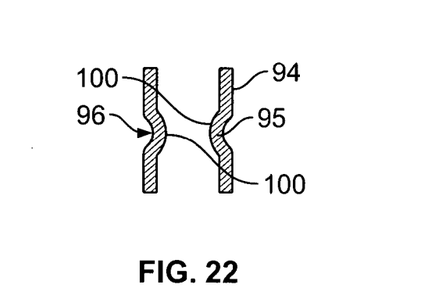
FIG. 22 illustrates a cross-sectional view of a fastener tube through line 22-22 of FIG. 21.

FIG. 20 illustrates an isometric view of a fastener tube 94 according to an embodiment of the present invention. FIG. 21 illustrates a top plan view of the fastener tube 94 according to an embodiment of the present invention. FIG. 22 illustrates a cross-sectional view of the fastener tube 94 through line 22-22 of FIG. 21.

Referring to FIGS. 20-22, the fastener tube 94 includes a fastener retention member 95. The fastener retention member 95 includes a reduced midsection of the fastener tube 94. That is, the fastener tube 94 includes a mid-section 99 that inwardly bows, thereby forming inwardly-directed protrusions 100 within the through channel 96. Similar to the protrusions discussed above with respect to FIGS. 6-11, for example, the protrusions 100 are configured to abut a fastener, thereby gripping, dragging and/or digging into the fastener in order to securely retain the fastener within the through channel 96.

Figure 23:
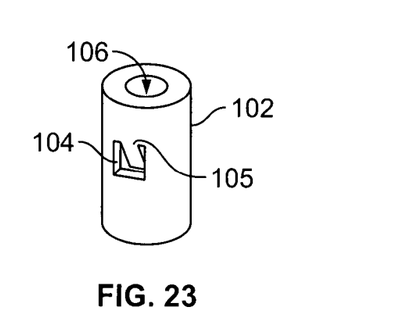
FIG. 23 illustrates an isometric view of a fastener tube according to an embodiment of the present invention.
Figure 24:
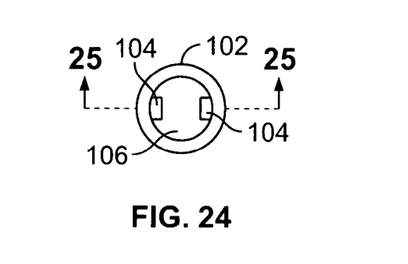
FIG. 24 illustrates a top plan view of a fastener tube according to an embodiment of the present invention.
Figure 25:
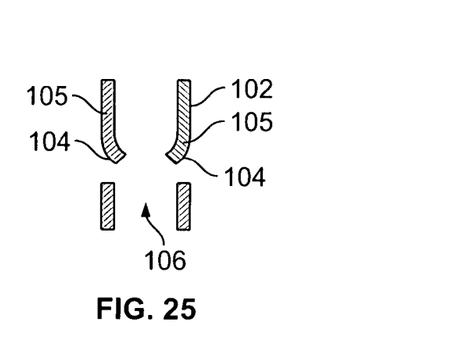
FIG. 25 illustrates a cross-sectional view of a fastener tube through line 25-25 of FIG. 24.

FIG. 23 illustrates an isometric view of a fastener tube 102 according to an embodiment of the present invention. FIG. 24 illustrates a top plan view of the fastener tube 102 according to an embodiment of the present invention. FIG. 25 illustrates a cross-sectional view of a fastener tube through line 25-25 of FIG. 24. The fastener tube 102 may take the place of the fastener tube 94 shown in FIG. 19.

Referring to FIGS. 23-25, the fastener tube 102 includes inwardly-canted tabs or flaps 104 formed from wall portions of the fastener tube 102. In particular, three sides of the tabs 104 are cut from the wall portions, and the tabs 104 are pivoted about their fixed ends 105 and urged inwardly into the through-channel 106. The tabs 105 act as protrusions that are configured to grip, drag and/or dig into a shaft of a fastener.

Figure 26:
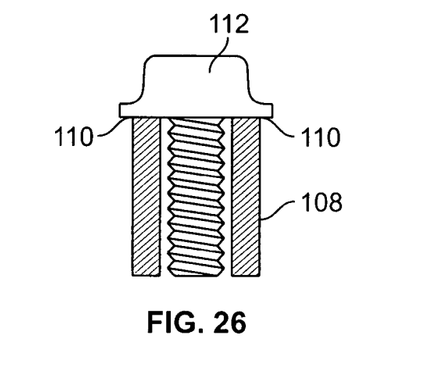
FIG. 26 illustrates an axial cross-sectional view of a fastener tube according to an embodiment of the present invention.

FIG. 26 illustrates an axial cross-sectional view of a fastener tube 108 according to an embodiment of the present invention. A layer of light-duty epoxy 110 may be positioned on a top edge of the fastener tube 108. The light duty epoxy 110 adhesively secures the fastener head 112 to the top edge of the fastener tube 108. The light duty epoxy 110 may be positioned on the fastener tube 108 before the fastener 112 is positioned therein. Optionally, a layer of light duty epoxy may be coated around the interface of the fastener 112 and the fastener tube 108 after the fastener 112 is secured within the fastener tube 108. The light duty epoxy may be designed to break away when the fastener 112 is rotatably engaged (e.g., rotating a screw to release the screw from the fastener tube 108).

Figure 27:
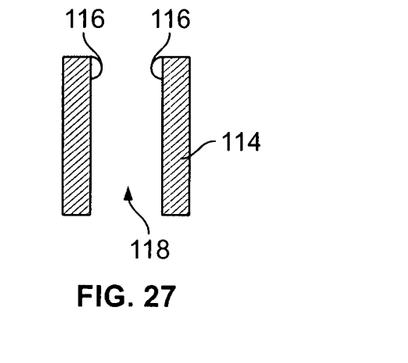
FIG. 27 illustrates an axial cross-sectional view of a fastener tube according to an embodiment of the present invention.

FIG. 27 illustrates an axial cross-sectional view of a fastener tube 114 according to an embodiment of the present invention. A nylon or wax drip 116 may be positioned on an inner surface of the fastener tube 114 within the through-channel 118 The drip 116 may be deposited before or after a fastener is inserted into the through-channel 118. The drip 116 dries to adhesively secure the fastener tube 114 to a fastener positioned within the through-channel 118. After the drip 116 has dried to form a secure connection between the fastener tube 114 and the fastener, a rotation of the fastener may break the dried adhesive connection.

Figure 28:
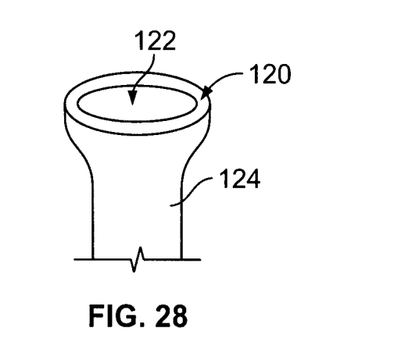
FIG. 28 illustrates an isometric view of a fastener tube according to an embodiment of the present invention.

FIG. 28 illustrates an isometric view of a fastener tube 120 according to an embodiment of the present invention. The fastener tube 120 includes a through-channel 122, and a tapered or crimped shaft 124, configured to conform to, or otherwise abut, a shaft of a fastener, thereby exerting a gripping and/or dragging force on the fastener.

Figure 29:
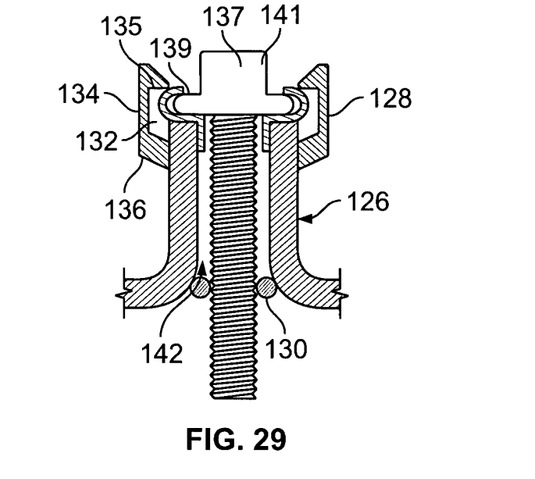
FIG. 29 illustrates an axial cross-sectional view of a fastener tube and fastener retaining members according to an embodiment of the present invention.

FIG. 29 illustrates an axial cross-sectional view of a fastener tube 126, a flange retainer 128 and a thread retainer 130 according to an embodiment of the present invention. The flange retainer 128 is a circumferential member having a central cavity 132 defined between a lateral wall 134, a head contact wall 135 and a tube engaging wall 136. The flange retainer 128 may be snapped onto the fastener 137 after it is secured within the fastener tube 126 such that the head contact wall 135 clamps over a flange or circumferential edge 139 of the head 141, while the tube-engaging wall 136 abuts the fastener tube 126. The circumferential edge 139 of the head 141 is positioned within the central cavity 132. Thus, the flange retainer 128 acts to securely clamp the fastener 137 within the fastener tube 126.

Additionally, the thread retainer 130 may be positioned within a lower portion of the through-channel 142. The thread retainer 130 is configured to be compressively sandwiched between the inner walls of the fastener tube 126 and the shaft of the fastener 137. For example, the thread retainer 130 may be formed of a resilient material configured to be compressed into the threads of a screw.

Figure 30:
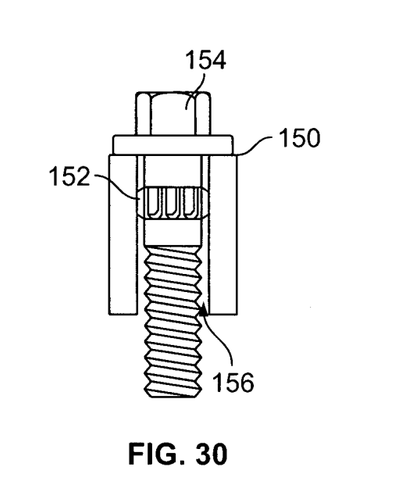
FIG. 30 illustrates an axial cross-sectional view of a fastener tube and fastener retention knurl according to an embodiment of the present invention.

FIG. 30 illustrates an axial cross-sectional view of a fastener tube 150 and fastener retention knurl 152 according to an embodiment of the present invention. The retention knurl 152 may be positioned around a shaft of a fastener 154 before insertion into the fastener tube 150. Optionally, the knurl 152 may be positioned within the through-channel 156 before the fastener 154 is positioned within the fastener tube 150. The knurl 152 is configured to be compressively sandwiched between the inner walls of the fastener tube 150 and the shaft of the fastener 154, thereby securing the fastener 154 within the through channel 156.

While examples of the retention securing members are shown as flaps, tabs, barbs, clasps, and the like, the retention securing members may include one protrusion, or a series of inwardly directed protrusions, such as teeth, flaps, tabs, and the like circumferentially spaced around the through-holes or through-channels. The retention securing members may include any structure that extends into a through-hole or through-channel that is configured to securely engage a fastener shaft.

Figure 31:
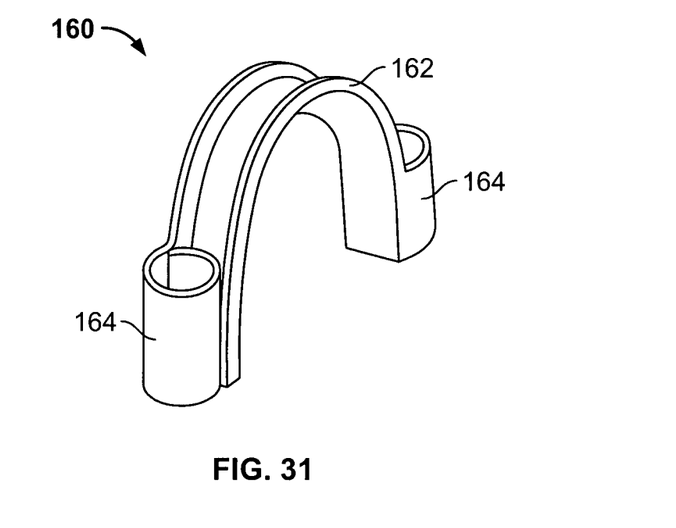
FIG. 31 illustrates a top isometric view of a bar clamp assembly according to an embodiment of the present invention.
Figure 32:
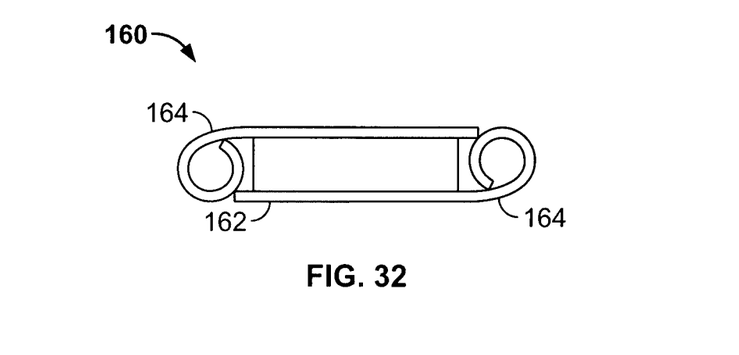
FIG. 32 illustrates a top plan view of a bar clamp assembly according to an embodiment of the present invention.

FIG. 31 illustrates a top isometric view of a bar clamp assembly 160 according to an embodiment of the present invention. FIG. 32 illustrates a top plan view of the bar clamp assembly 160 according to an embodiment of the present invention. Referring to FIGS. 31 and 32, the bar clamp assembly 160 includes a bar clamp 162 integrally formed with fastener tubes 164. As shown, the fastener tubes 164 are not welded to the bar clamp 162. Instead, the bar clamp assembly 160 is formed from a single piece of material that is rolled to form the fastener tubes 164. Because the fastener tubes 164 and the bar clamp 162 are integrally fashioned to form a single, unitary, bar clamp assembly 160, the bar clamp assembly 160 does not include any heat-affected zones that are susceptible to warping or breaking. The fastener tubes 164 may include the various fastener retention members discussed above.

Figure 33:
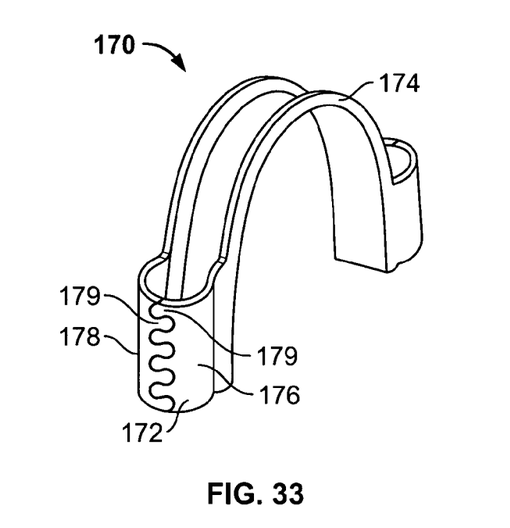
FIG. 33 illustrates a top isometric view of a bar clamp assembly according to an embodiment of the present invention.
Figure 34:
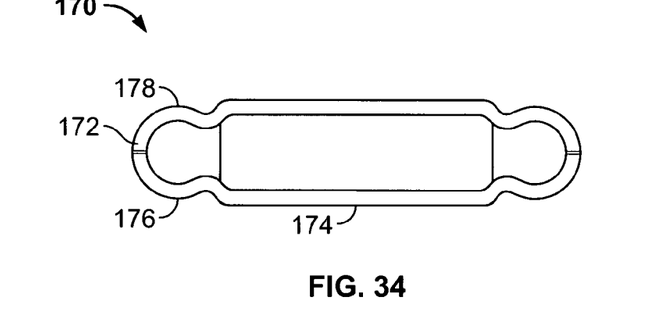
FIG. 34 illustrates a top plan view of a bar clamp assembly according to an embodiment of the present invention.

FIG. 33 illustrates a top isometric view of a bar clamp assembly 170 according to an embodiment of the present invention. FIG. 34 illustrates a top plan view of the bar clamp assembly according 170 to an embodiment of the present invention. Referring to FIGS. 33 and 34, instead of the fastener tubes 172 being welded to the bar clamp 174, separate half tubes 176 and 178 are integrally formed with the bar clamp 174. The half tubes 176 and 178 each include interlocking members 179, such as intermeshing teeth, curves, and the like, that cooperate with one another to secure each half tube 176 and 178 to one another. The half tubes 176 and 178 may be woven together through the interlocking members 179. As such, a unitary bar clamp assembly 170 is formed without any welding.

Figure 35:
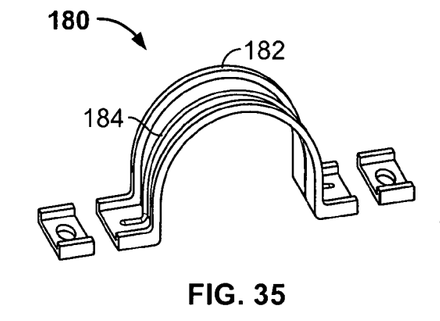
FIG. 35 illustrates an isometric view of a bar clamp assembly according to an embodiment of the present invention.

FIG. 35 illustrates an isometric view of a bar clamp assembly 180 according to an embodiment of the present invention. The bar clamp assembly 180 may be formed of plastic main body 182 and a stiffening layer 184, such as a layer of metal, within the plastic main body 182. The stiffening layer 184 provides added rigidity and robustness to the bar clamp assembly 180. The main body 182 and the stiffening layer 184 may be formed of various plastics and metals. Further, the main body 182 may be metal, and the stiffening layer 184 may be plastic.

Figure 36:
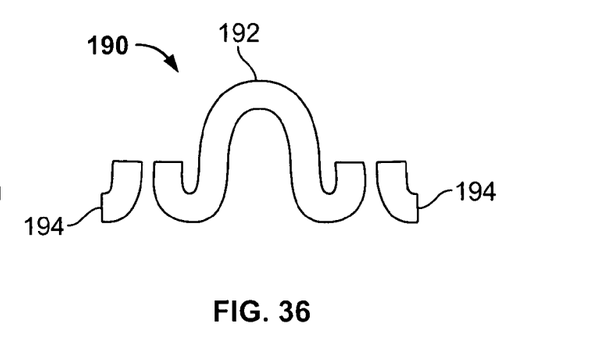
FIGS. 36 illustrates a transverse cross-sectional view of a bar clamp assembly according to an embodiment of the present invention.

FIG. 36 illustrates a transverse cross-sectional view of a bar clamp assembly 190 according to an embodiment of the present invention. The bar clamp assembly 190 may include a bar clamp 192 integrally formed with fastener tubes 194. As shown in FIG. 36, the bar clamp assembly 190 may be integrally formed through an extrusion process. That is, the fastener tubes 194 may be extruded from the same piece of material as the bar clamp 192 to form the single, integrally formed bar clamp assembly 190. Thus, the fastener tubes 194 are not welded to the bar clamp 192.

Figure 37:
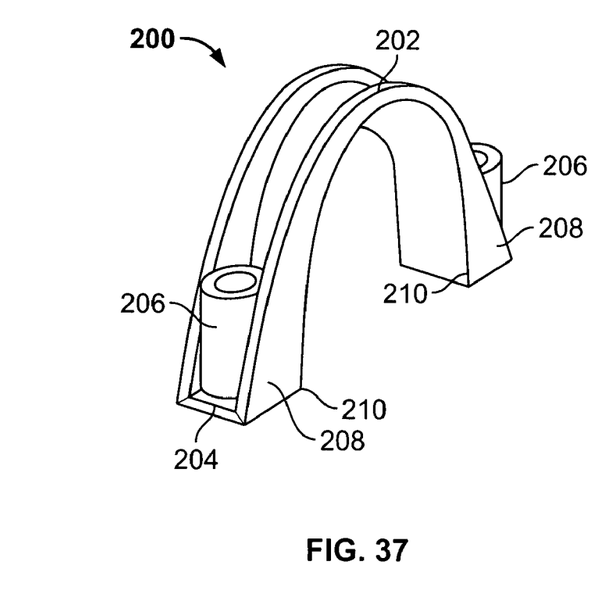
FIG. 37 illustrates a top plan view of a bar clamp assembly according to an embodiment of the present invention.

FIG. 37 illustrates a top plan view of a bar clamp assembly 200 according to an embodiment of the present invention. The bar clamp assembly 200 includes a bar clamp 202 integrally formed with securing bases 204. Fastener tubes 206 may upwardly extend from the securing bases 204. Optionally, instead of the fastener tubes 206, the securing bases 204 may include fastener straps, such as shown and described with respect to FIGS. 5 and 14.

The bar clamp assembly 200 includes gussets or braces 208 that integrally join the securing bases 204 to the bar clamp 202. The braces 208 extend along the length of the securing bases 204 and integrally connect to the bar clamp, thereby forming an arch-shape. The braces 208 provide added strength to the bar clamp assembly 200, thereby bracing against warping or breaking at inner joints 210.

Figure 38:
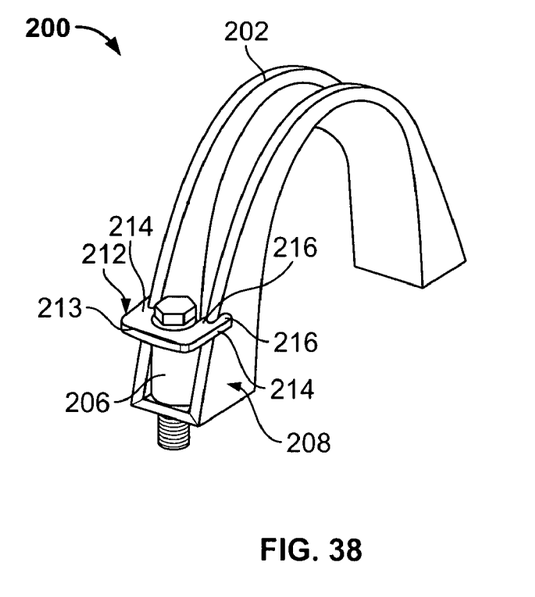
FIG. 38 illustrates a top plan view of a bar clamp assembly with side clips according to an embodiment of the present invention.

FIG. 38 illustrates a top plan view of the bar clamp assembly 200 with side clips 212 according to an embodiment of the present invention. The side clips 212 provide additional support to the bar clamp assembly 200. Each side clip 212 is C-or U-shaped and includes a tube engagement portion 213 integrally formed with bar clamp securing arms 214 configured to secure to outer walls of the bar clamp 202. Each bar clamp securing arm 214 may include prongs 216 separated by a gap 218. An upper edge portion of an outer wall of the bar clamp 202 is configured to be compressively sandwiched between the prongs 216 within the gap 218.

A side clip 212 is positioned around a fastener tube 206 such that the tube engagement portion 213 is positioned around the fastener tube 206, while the bar clamp securing arms 214 secure to the bar clamp 202. As such, the side clips 212 provide additional bracing support to the bar clamp assembly 200.

Figure 39:
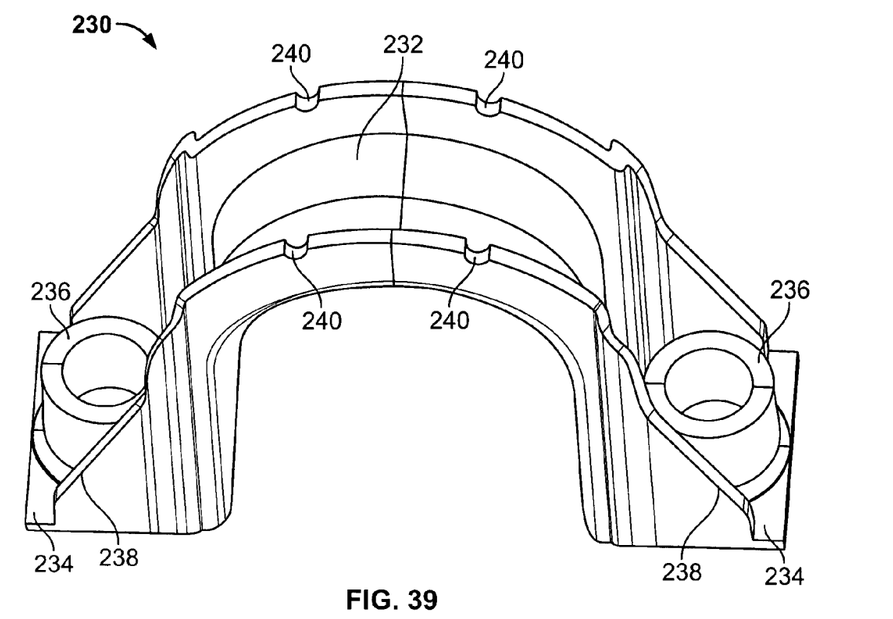
FIG. 39 illustrates a top isometric view of a bar clamp assembly according to an embodiment of the present invention.
Figure 40:
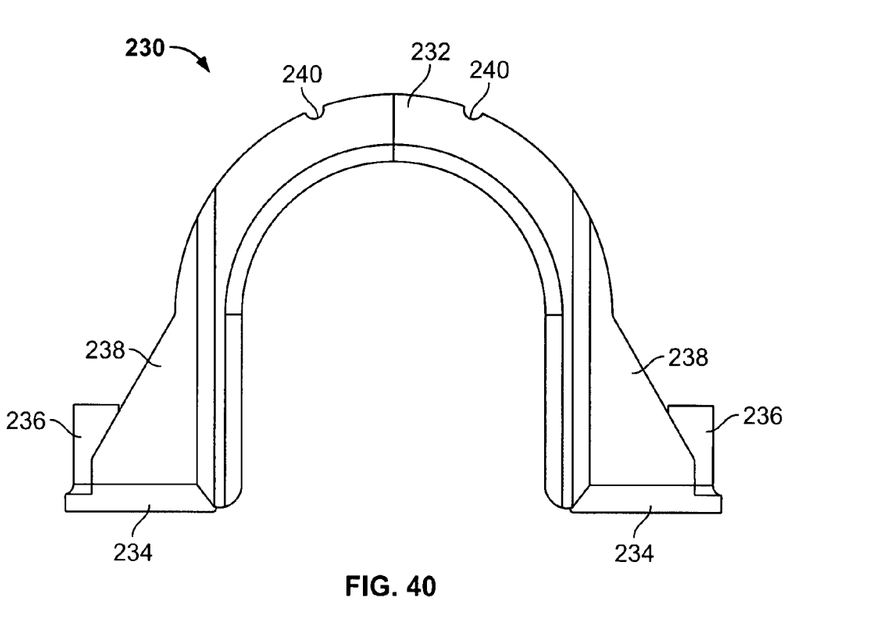
FIG. 40 illustrates a front elevational view of a bar clamp assembly according to an embodiment of the present invention.
Figure 41:
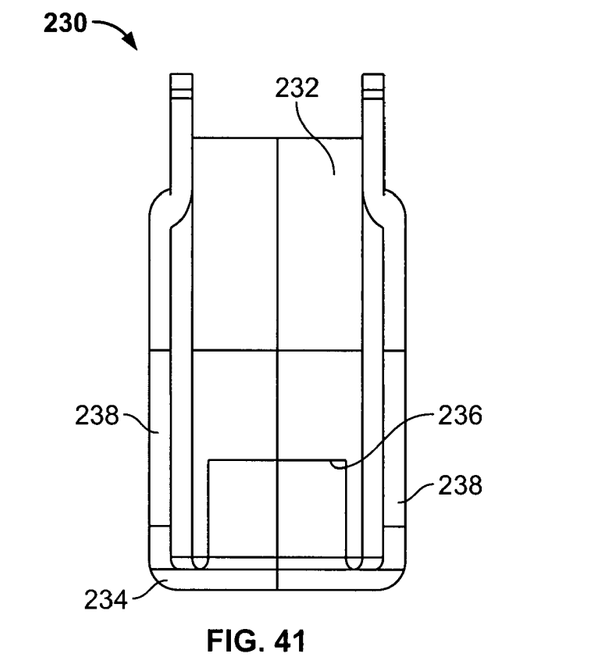
FIG. 41 illustrates a lateral elevational view of a bar clamp assembly according to an embodiment of the present invention.

FIG. 39 illustrates a top isometric view of a bar clamp assembly 230 according to an embodiment of the present invention. FIG. 40 illustrates a front elevational view of the bar clamp assembly 230 according to an embodiment of the present invention. FIG. 41 illustrates a lateral elevational view of the bar clamp assembly 230 according to an embodiment of the present invention. The bar clamp assembly 230 is integrally formed of a unitary piece of material (such as in an extrusion process). The bar clamp assembly 230 includes a bar clamp 232 integrally formed with securing bases 234. The securing bases 234 include fastener tubes or bosses 236 that upwardly extend from the securing bases 234. Optionally, the bar clamp assembly 230 may not include the fastener tubes 236. Instead, the securing bases 234 may be fastener straps, as shown and described in FIGS. 5 and 14. Whether fastener tubes are included or not, the bar clamp assembly 230 may include any of the fastener retention members discussed above.

Angled braces 238 integrally connect the securing bases 234 to the bar clamp 232. Similar to the braces 208 shown in FIG. 37, the braces 238 provide a bracing support to the bar clamp assembly 230, and act to prevent the securing bases 234 from warping or breaking with respect to the bar clamp 232.

As shown in FIGS. 39 and 40, in particular, the bar clamp 232 includes a series of notches 240 formed through upper edges of the bar clamp 232. The notches 240 may be used for tool alignment and may also reduce cracking around ridges of the bar clamp 232.

As shown in FIG. 41, for example, the braces 238 outwardly flare away from the fastener tube 236. The wide area around the extruded fastener tubes 236 provides sufficient space for tooling.

Figure 42:
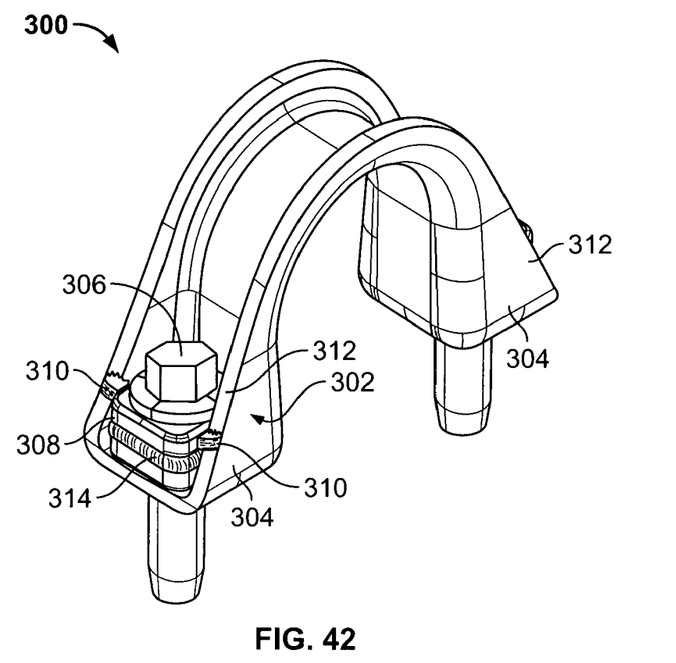
FIG. 42 illustrates a top isometric view of a bar clamp assembly according to an embodiment of the present invention.

FIG. 42 illustrates a top isometric view of a bar clamp assembly 300 according to an embodiment of the present invention. The bar clamp assembly 300 includes a bar clamp 302 integrally formed with securing bases 304. In order to secure the bar clamp assembly 300 to a structure, fasteners 306, such as threaded bolts or screws, are positioned through reciprocal compression tubes 308 positioned on or within the bases 304. The compression tubes 308 may be threaded and act to secure the fasteners 306 from movement therein. Securing tabs 310 inwardly extend toward the fasteners 306 and compression tubes 308 from angled braces 312. The securing tabs 310 abut against the compression tubes 308 and/or the fasteners 306, thereby preventing the compression tubes 308 and the fasteners 306 from shifting with respect to the bases 304. Additionally, ridges 314 may outwardly around the perimeters of the compression tubes 308. The ridges 314 may abut against undersides of the securing tabs 310 in order to prevent movement of the compression tubes 308 and fasteners 306 over the bases 304. Alternatively, the compression tubes 308 and/or the fasteners 306 may not be threaded, or may be partially threaded.

While the bar clamp assembly 300 is shown having a securing tab 310 inwardly extending from each angled brace 312, more or less securing tabs 310 than those shown may be used. Additionally, the compression tubes 308 may or may not include the ridges 312.

Figure 43:
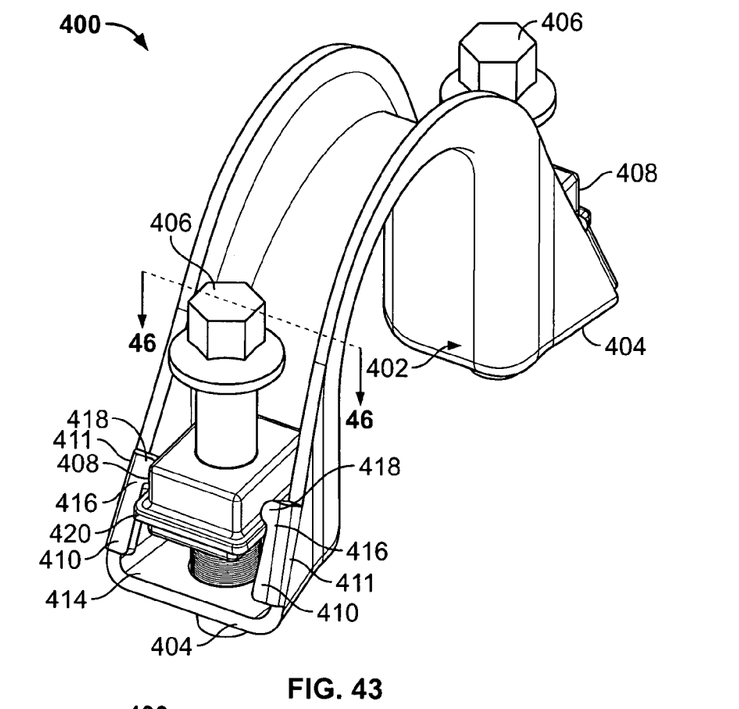
FIG. 43 illustrates a top isometric view of a bar clamp assembly according to an embodiment of the present invention.
Figure 44:
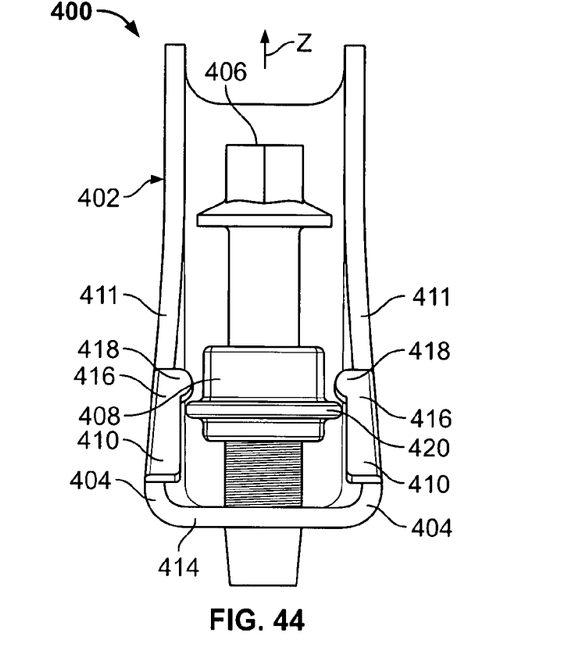
FIG. 44 illustrates a front elevational view of a bar clamp assembly according to an embodiment of the present invention.
Figure 45:
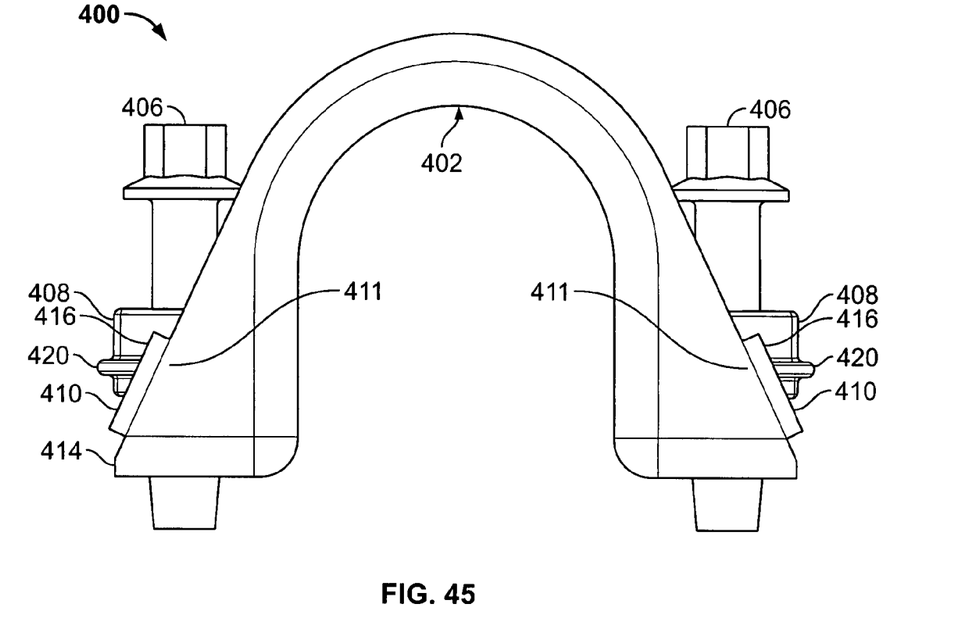
FIG. 45 illustrates a lateral elevational view of a bar clamp assembly according to an embodiment of the present invention.

FIGS. 43, 44, and 45 illustrate top isometric, front elevational, and lateral elevational views, respectively, of a bar clamp assembly 400 according to an embodiment of the present invention. Referring to FIGS. 43-45, the bar clamp assembly 400 includes a bar clamp 402 integrally formed with securing bases 404. In order to secure the bar clamp assembly 400 to a structure, fasteners 406, such as threaded bolts or screws, are positioned through reciprocal compression tubes 408 positioned on or within the bases 404. The compression tubes 408 may be threaded and act to secure the fasteners 406 from movement therein. Compression tube guides 410 inwardly extend from lateral walls 411 of the securing bases 404 proximate lower shelves 414 toward positions above portions of the compression tubes 408. Distal ends 416 of the compression tube guides 410 include protuberances 418 that extend over a ridge 420 of a compression tube 408 in an abutting relationship. The protuberances 418 prevent the compression tubes 408 from dislodging in the direction of arrow Z (shown in FIG. 44). The compression tube guides 410 securely retain the compression tubes 408 in position. The compression tube guides 410 act to trap the compression tubes 408 within the bar clamp assembly 400 at positions above the lower shelves 414. That is, the compression tube guides 410 prevent the compression tubes 408 from abutting the lower shelves 414 while at the same time securing biasing the compression tubes 408 into the bar clamp 402. The compression tube guides 410 prevent the compression tubes from twisting, or jamming with respect to the bar clamp 402 during an assembly process. In general, the compression tube guides 410 ensure proper and optimal location of the compression tubes 408 with respect to the walls of the bar clamp 402.

Figure 46:
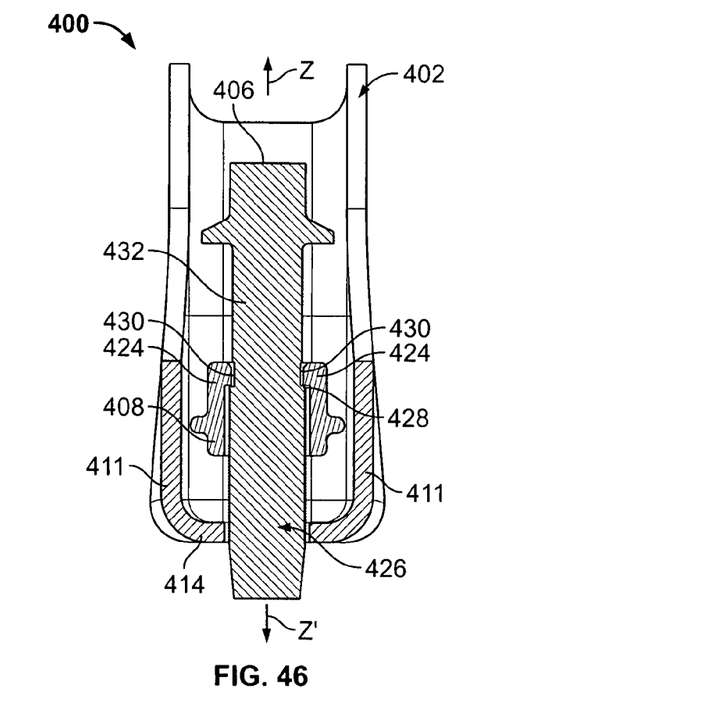
FIG. 46 illustrates a partial cross-sectional view of a bar clamp assembly through line 46-46 of FIG. 43 according to an embodiment of the present invention.

FIG. 46 illustrates a partial cross-sectional view of the bar clamp assembly 400 through line 46-46 of FIG. 43. Each fastener 406 is threaded through the top of a compression tube 408. The top of each compression tube 408 includes threads 424. The threads 424 are positioned over a threaded portion 426 of the fastener 406 in the assembled position. An upper ridge 428 of the threaded portion 426 is positioned below the threads 424. The threads 424 prevent the threaded portion 426 of the fastener 406 from moving in the direction of arrow Z.

During assembly, the fastener 406 is torqued and/or driven into the compression tube 408 until a notch 430 formed in the unthreaded portion 432 of the fastener 406 encounters the threads 424 of the compression tube 408. At this point, the threads 424 snap or otherwise move into the notch 430, thereby securing the fastener 406 to the compression tube 408. Thus, the compression tube 408 prevents the fastener 406 from receding in the direction of arrow Z. However, the fastener 406 may still be driven in the direction of arrow Z' in order to secure the bar clamp assembly 400 to a structure, such as a vehicle frame.

Thus, embodiments of the present invention provide a robust and sturdy bar clamp assembly that does not include weakened areas, such as welded areas. The various fastener retention members ensure that fasteners are secured within the fastener through-holes or through-channels. Additionally, features such as the support washers and braces prevent the bar clamp assemblies from warping or breaking at the unions or junctions between bar clamps and securing bases. Moreover, because embodiments of the present invention provide bar clamp assemblies that may be integrally formed from a single piece of extruded or molded material, the bar clamp assemblies may not include any welded portions.

It is to be understood that terms such as top, bottom, above, below, lower, and upper are relative terms. While these terms have been used to describe embodiments of the invention, such terms are merely used with respect to the drawings. That is, the orientations described may be inverted depending on the placement of the various bar clamp assemblies shown and described.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A bar clamp assembly configured to be secured to a structure through first and second fasteners, the bar clamp assembly comprising:
   a bar clamp;
   first and second securing bases integrally formed with said bar clamp;
   first lateral walls positioned between said first securing base and said bar clamp, wherein said first lateral walls are configured to prevent stress fatigue between said bar clamp and said first securing base;
   second lateral walls positioned between said second securing base and said bar clamp, wherein said second lateral walls are configured to prevent stress fatigue between said bar clamp and said second securing base;
   first guides inwardly extending from said first lateral walls, said first guides including first protuberances;
   second guides inwardly extending from said second lateral walls, said second guides including second protuberances;
   a first fastener retention member that is at least one of on and/or within said first securing base, said first fastener retention member configured to secure and retain the first fastener, said first guides and said first protuberances configured to locate and securely retain said first fastener retention member to said first securing base with respect to said bar clamp; and
   a second fastener retention member that is at least one of on and/or within said second securing base, said second fastener retention member configured to secure and retain the second fastener, said second guides and said second protuberances configured to locate and securely retain said second fastener retention member to said second securing base with respect to said bar clamp.

2. The bar clamp assembly of claim 1, wherein said first fastener retention member includes a first ridge for abutting cooperation with said first protuberances, and said second fastener retention member includes a second ridge for abutting relationship with said second protuberances.

3. The bar clamp assembly of claim 1, wherein each of said first and second fastener retention members include internal threads configured to engage the first and second fasteners.

4. The bar clamp assembly of claim 3, wherein each of the first and second fasteners include a notch formed in unthreaded portions thereof for mating engagement with the associated internal threads of said first and second fastener retention members.

* * * * *